Aug. 4, 1925.

R. P. SMITH

ROPE GRIP

Filed Oct. 31, 1924

1,548,765

Ralph P. Smith.
INVENTOR
BY Victor J. Evans.
ATTORNEY

WITNESS:

Patented Aug. 4, 1925.

1,548,765

UNITED STATES PATENT OFFICE.

RALPH P. SMITH, OF HUDSON FALLS, NEW YORK.

ROPE GRIP.

Application filed October 31, 1924. Serial No. 747,118.

*To all whom it may concern:*

Be it known that I, RALPH P. SMITH, a citizen of the United States, residing at Hudson Falls, in the county of Washington and State of New York, have invented new and useful Improvements in Rope Grips, of which the following is a specification.

This invention relates to rope grips and designed to automatically grip the rope and hold it taut after the rope has been stretched, the invention being primarily intended to be used with clothes line pulleys.

In carrying out the invention, I provide means constructed to cooperate with one of the pulleys over which the line is trained, for the purpose of preventing rotation of the pulley, and thereby hold one end of the line substantially stationary, while the other end of the line is being drawn taut, and which means is subsequently used to hold the upper and lower runs of the line substantially parallel.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein.

Figure 1:
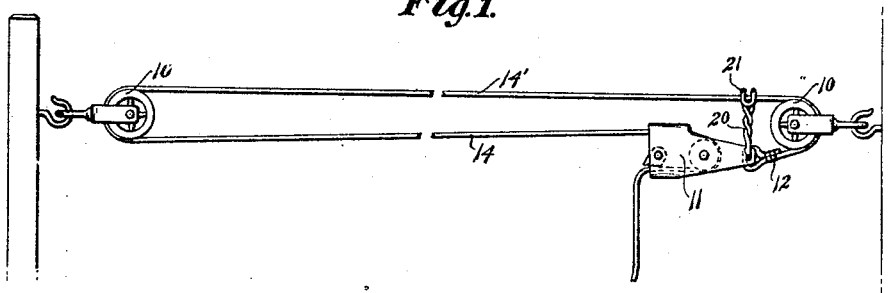
Figure 1 is a view in elevation showing how the tightener is associated with the adjacent ends of the line and how the runs of the line are held substantially parallel.

Referring to the drawing in detail 10 represents a pair of spaced line pulleys which are adapted to be supported in the ordinary well known manner and about which is trained the clothes line. Interposed between the adjacent ends of this line is the tightener forming the subject matter of the present invention.

Figure 3:
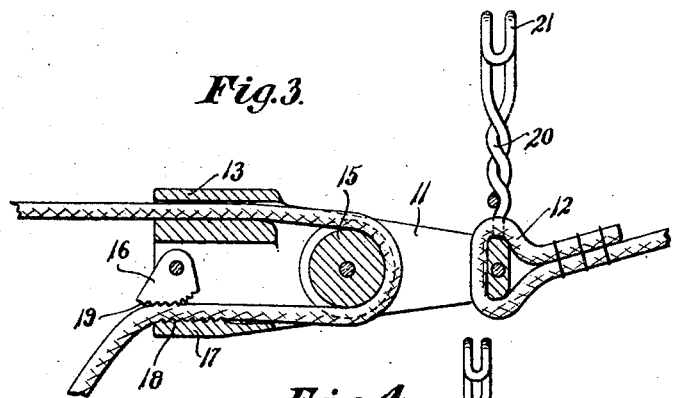
Figure 3 is an enlarged sectional view through the device forming the subject matter of the invention.

This tightener includes a housing indicated generally at 11 and the housing is attached to one end 12 of the line as clearly shown in Figure 3. This housing is formed with a guide 13 which receives the lower run 14 of the line which run is subsequently trained over a pulley wheel 15 journaled between the side walls of the housing 11. The free end of the run 13 is then passed between a pivoted dog 16 and the lower wall 17 of the housing, this wall being serrated as at 18 to cooperate with the teeth 19 formed on the dog 16 for holding the rope taut after it has been stretched as will be readily understood. The dog 16 is formed with a substantially cam like surface along which the teeth 19 are arranged, and the free end of the rope is therefore effectively gripped between the dog and the serrated lower wall 17 of the housing to prevent slipping of the rope after it has been drawn taut.

Figure 2:
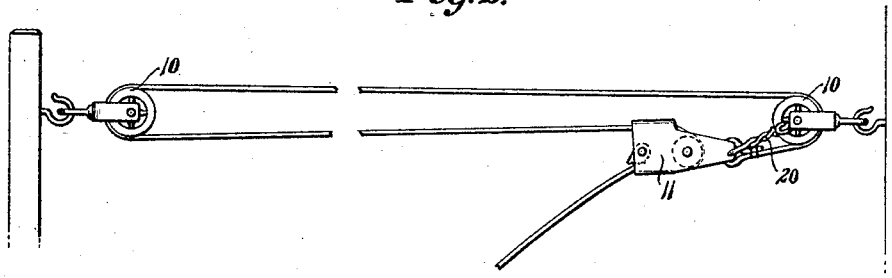
Figure 2 is a similar view showing how one of the pulleys is held against rotation when it is desired to draw the line taut.

Pivoted on the housing 11 at a point adjacent the point of connection between the housing and the adjacent end 12 of the line is an element preferably formed from wire and including a twisted shank 20 which terminates to provide a hook 21. This element is used in a two fold capacity, and its different active positions are clearly illustrated in Figures 1 and 2. When this element is used to hold the upper or lower runs of the lines substantially parallel, the said element is arranged at a right angle to the housing so that the hook 21 engages the upper run 14' of the line. When in this position the upper and lower runs of the line cannot be appreciably separated. Now, when it is desired to draw the line taut, it is necessary to hold one end of the line stationary, and for this purpose the element 20 is swung upon its pivot to the position shown in Figure 2, in which position the hook 21 is passed between the spokes of the adjacent pulley wheel 10. Consequently the wheel is held against rotation, and the adjacent end of the line held substantially stationary, so that the free end of the line can be drawn around the pulley wheel 15 for the purpose of drawing the line taut. After the line has been drawn taut and released, the dog 16 will automatically cause the line to be impinged therebetween and the serrated wall 17 of the housing to prevent slipping of the line.

Figure 4:
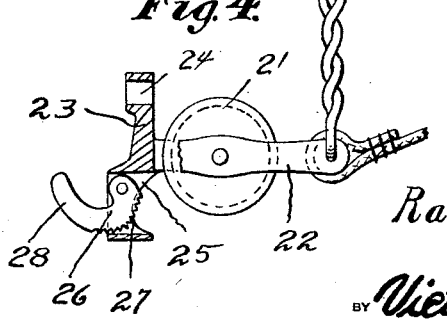
Figure 4 is a view of a modified construction.

In Figure 4, I have shown a modified form of the invention, wherein the pulley is indicated at 21 and journalled in a bracket 22 which forms part of a housing construction, including a right angularly disposed portion 23 arranged at one end of the bracket 22. This portion 23 is formed with an opening 24 which constitutes a guide for the upper run of the cable illustrated in the other figures of the drawing, while the lower run of the cable passes through a larger opening 25. Pivoted within the opening 25 is a cam 26 having one edge thereof as at 27 bite into the adjacent run of the cable and hold the latter taut as will be readily understood. The cam 26 is formed with a long tail like portion 28 which allows the cam to be easily lifted, and at the same time affords the cam considerable weight to allow it to automatically gravitate to its active position and remain in effective contact with the cable. The purpose of the invention is the same as hereinafter described in connection with the preferred embodiment of the invention.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

The combination with a pair of spaced pulleys, and a line trained over said pulleys, of a tightener including a housing secured to one end of the line, a pulley journaled within said housing, a guide formed on said housing and adapted to receive the line prior to passing the latter above the pulley and said housing, means for gripping and holding the free end of the line immovable, a hook like element pivoted on said housing and adapted to engage one run of the line to hold the lower run thereof substantially parallel with the upper run, and said element being further adapted to be swung upon its pivot to engage the adjacent pulley to prevent rotation of the latter while the line is being drawn through the tightener.

In testimony whereof I affix my signature.

RALPH P. SMITH.